United States Patent [19]

Harris

[11] Patent Number: 4,641,682

[45] Date of Patent: Feb. 10, 1987

[54] VALVE WITH ROTARY VALVE HEAD

[75] Inventor: Gary L. Harris, Houston, Tex.

[73] Assignee: Baker Oil Tools, Inc., Orange, Calif.

[21] Appl. No.: 728,611

[22] Filed: Apr. 29, 1985

[51] Int. Cl.[4] .................. F16K 43/00; F16K 25/00; F16K 5/20

[52] U.S. Cl. .................. 137/329.04; 251/163; 251/174; 251/357

[58] Field of Search ............. 137/630.15, 329.04, 137/329.03, 329.02, 329.01, 329, 329.06; 251/357, 160, 161, 162, 163, 316, 159, 317, 315

[56] References Cited

U.S. PATENT DOCUMENTS

| | | | |
|---|---|---|---|
| 1,165,197 | 12/1915 | Marsh | 251/357 X |
| 3,155,368 | 11/1964 | Shafer | 251/315 X |
| 3,245,653 | 4/1966 | Lavigueur | 251/163 X |
| 3,532,320 | 10/1970 | Fisch | 137/329.02 X |
| 3,653,631 | 4/1972 | Hurst | 251/161 X |

Primary Examiner—Martin P. Schwadron
Assistant Examiner—John S. Starsiak, Jr.
Attorney, Agent, or Firm—Norvell & Associates

[57] ABSTRACT

A valve having a rotary valve head with an elastomeric seal attached to the valve head for use in a conduit is disclosed. Separate embodiments for use in a downhole tool and in an accessible surface valve are disclosed. An axially movable actuator tube is engagable with the elastomeric seal to maintain sealing integrity. A valve head with an integrally mounted seal can be actuated by an axially movable camming member or by a lever pivoting about an axis transverse to the conduit. Rotation of the valve head from the closed position aligns a flow passage with the conduit to permit fluid flow.

1 Claim, 10 Drawing Figures fig.1 fig. 2 fig.3 fig. 4 fig.5 fig. 6 fig. 8 fig. 9 fig. 10

VALVE WITH ROTARY VALVE HEAD

BACKGROUND OF THE INVENTION

1. Field of the Invention

This invention relates generally to the valves having a rotary valve head engagable with a valve seat, and more specifically to valves used to regulate the transmission of fluids in an oil or gas well, whether on the surface or at a subsurface location.

2. Description of the Prior Art

Valves for controlling the flow of fluids in a conduit by opening or closing the conduit commonly employ rotary manipulation of the valve head. Such valves suitable for maintaining a substantially fully open bore, without substantially restricting the fluid flow area through the valve, commonly employ a ball-type valve. Such valves can be used in a fluid transmission conduit carrying fluids to or away from a subterranean well producing oil or gas, or in the well head at the surface of the well, or at a subsurface location in the producing oil or gas well. For example, a test valve for producing a limited amount of fluid from a subterranean producing formation can be located at a subsurface location. A safety valve for automatically shutting-in a well in the event of an emergency is normally located at a subsurface location, especially in an offshore well, may also employ a ball-type valve.

Valves of this type can be rotated between the open and the closed positions in a number of different ways. For example, where the conduit containing a conventional ball valve is readily accessible, the ball valve head can be rotated about its axis by rotating a stem attached to the ball valve head. Appropriate lever means can be used to permit manual or mechanical rotation of the ball valve head. With the valve element located in an inaccessible location, such at a subsurface location in an oil or gas well, some other means must be provided to manipulate the valve head between its open and closed position. A typical means for actuating a rotary valve head located in an inaccessible location is use of an axially shiftable actuator or flow tube that can be moved towards and away from valve head in the direction of the axis of the fluid transmission conduit. An axially directed force is transmitted from the axially movable actuator flow tube to the rotatable ball valve head at a point offset from the axis of rotation of the valve head. For example, a pin engaging a ball valve head at a point spaced from the axis of rotation passing through the center of the valve head, perpendicular to the axis of the fluid transmission conduit, can transmit force from the axially reciprocal flow tube or actuator to the ball valve head at a point offset from the axis of rotation. Conversely, the rotatable valve head itself can be shifted in the axial direction relative to the fluid transmission conduit. Movement of an axially shiftable tubular member attached to a stem passing through the axis rotation of a ball valve element, moves the ball valve element axially within fluid transmission conduit or valve housing. A stationary element, such as pin, engaging the valve element at a point offset from the axis of rotation will then cause the valve element to be moved between the open and closed positions.

Sealing integrity is normally established in a conventional valve by engagement of the valve head with a cooperable valve seat. The valve seat normally comprises a circular or cylindrical member engagable with an abutting surface on the rotatable ball-type valve head. The valve seat normally includes a sealing surface or sealing element incorporated therein. For example, a resilient or elastomeric valve seal is often employed around the periphery of the cylindrical valve seat. This seal engages the spherical exterior of a ball-type valve head when the bore through the ball valve head is perpendicular to the axis of the valve housing. Some valve seats normally rely upon metal-to-metal contact between the valve seat and the ball valve head, although adequate sealing integrity can require excessive contact forces. It is not uncommon for conventional valves to employ metal-to-metal contact in conjunction with a resilient or elastomeric sealing element, so that the resilient sealing element is trapped between adjacent and supporting metal surfaces on the valve seat to prevent lateral extrusion of the resilient seal element when subjected high pressure. To insure that sealing integrity can be properly maintained, this outer spherical surface must be precisely machined, adding to the cost of the valve. Furthermore, the outer surface must have the proper surface finish, and that surface finish must be maintained if the valve is to function properly. Corrosion is often a problem in the environment in which ball valves are used, especially in conjunction with the production of oil and gas from a subterranean well. In the past it has been difficult to maintain the proper surface finish in the presence of corrosive fluids.

In order to avoid wear on the valve seat and the valve seal and to prevent sticking, some conventional ball valves employ an axially shiftable annular valve seat. For example, it is not uncommon to provide a valve seat with accompanying valve seal on an axially shiftable actuator or flow tube. This actuator or flow tube is normally spaced from the surface of the ball-type valve head during rotation between the opened and closed positions, and is only brought into engagement with the valve head surface when the valve has been shifted to the fully closed position.

Conventional ball valves, using conventional resilient or elastomeric sealing materials also have not been completely successful in preventing leakage of gases produced in subterranean wells or flowing in a surface conduit. Conventional elastomers are permeable and permit commonly encountered gases to pass directly through the body of the seal. If a metal-to-metal contact is to be maintained between the valve seat and the outer surface of the ball valve head to improve the sealing integrity in the presence of gases, integrity of the ball valve head surface contour and surface finish are even more critical.

SUMMARY OF THE INVENTION

A valve for use in controlling the flow of a fluid in a conduit conduit comprises a valve housing with a valve head rotatable about an axis transverse to the axis of the conduit positioned in the valve housing. The valve head is rotatable between open and closed positions. The rotatable valve head is engagable with an annular seat element which is also movable relative to the valve head. An annular seal, which can be a resilient or elastomeric member, is secured to the valve head, and the annular seat element is engagable with the annular seal when the valve head is in a closed position. Interengagement between the annular seat element and the seal on the valve head isolates portions of the conduit on opposite sides of the valve head. Relative movement between the annular seat element and the valve head in the direction of the axis of the conduit can be imparted by mechanical or hydraulic means. Hydraulic or mechanical force also can be used to rotate the valve head.

In the preferred embodiment of this invention, the valve head has a bore extending completely through the valve head transverse to the axis of rotation of the valve head. In this preferred embodiment of this invention, the annular seal is secured to the exterior of the valve head between the ends of the bore extending through the valve head. The annular element comprising the valve seat engages the annular seal when the valve head is in the closed position, and in the preferred embodiment of the invention, the annular valve seat element is shiftable away from the valve head prior to rotation of the valve head from the closed to the opened position. Two annular valve seals may be securred to opposite sides of the valve head so that the valve seal on each side of the valve head can be brought into engagement with both valve seals. Conversely, the two valve elements on opposite sides of the valve head can comprise redundant sealing elements which can be brought into engagement with a single valve seat or a single shiftable flow tube. When the sealing integrity maintained by engagement between the valve seat and a first annular valve seal falls below an acceptable minimum, the valve head can be rotated 180 degrees to align the second redundant annular valve seal element also secured to the valve head with the same valve seat.

DETAILED DESCRIPTION OF THE PREFERRED EMBODIMENTS

Figure 4:
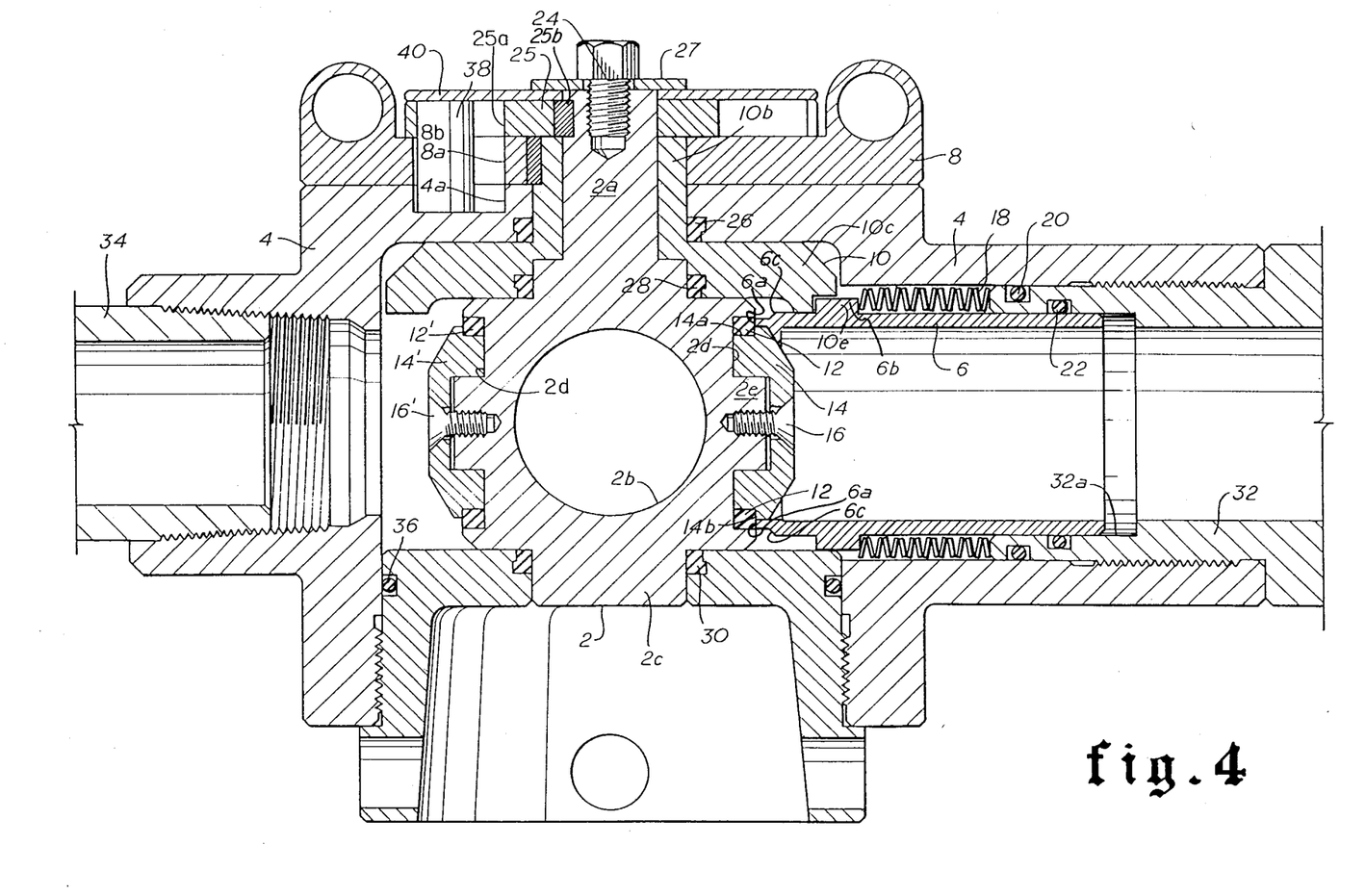
FIG. 4 is a view of a valve similar to the valve shown in FIG. 1 in which a higher pressure on the side of the valve opposite the actuator sleeve or valve seat has moved the valve seat out of engagement with the valve head to unload the valve.
Figure 5:
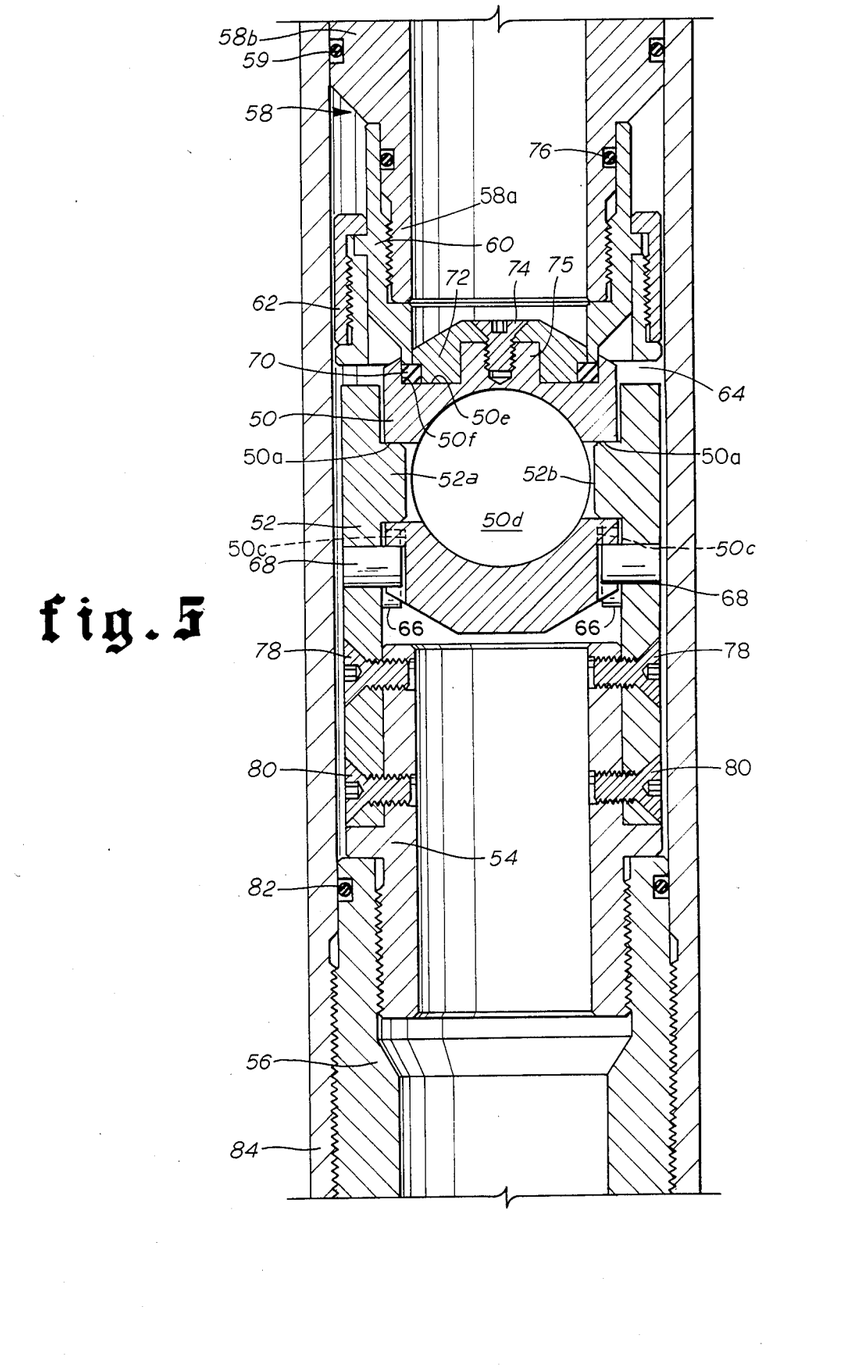
FIG. 5 is a sectional view of a valve which can be used in an inaccessible location such as a subsurface location in a subterranean oil or gas well.
Figure 6:
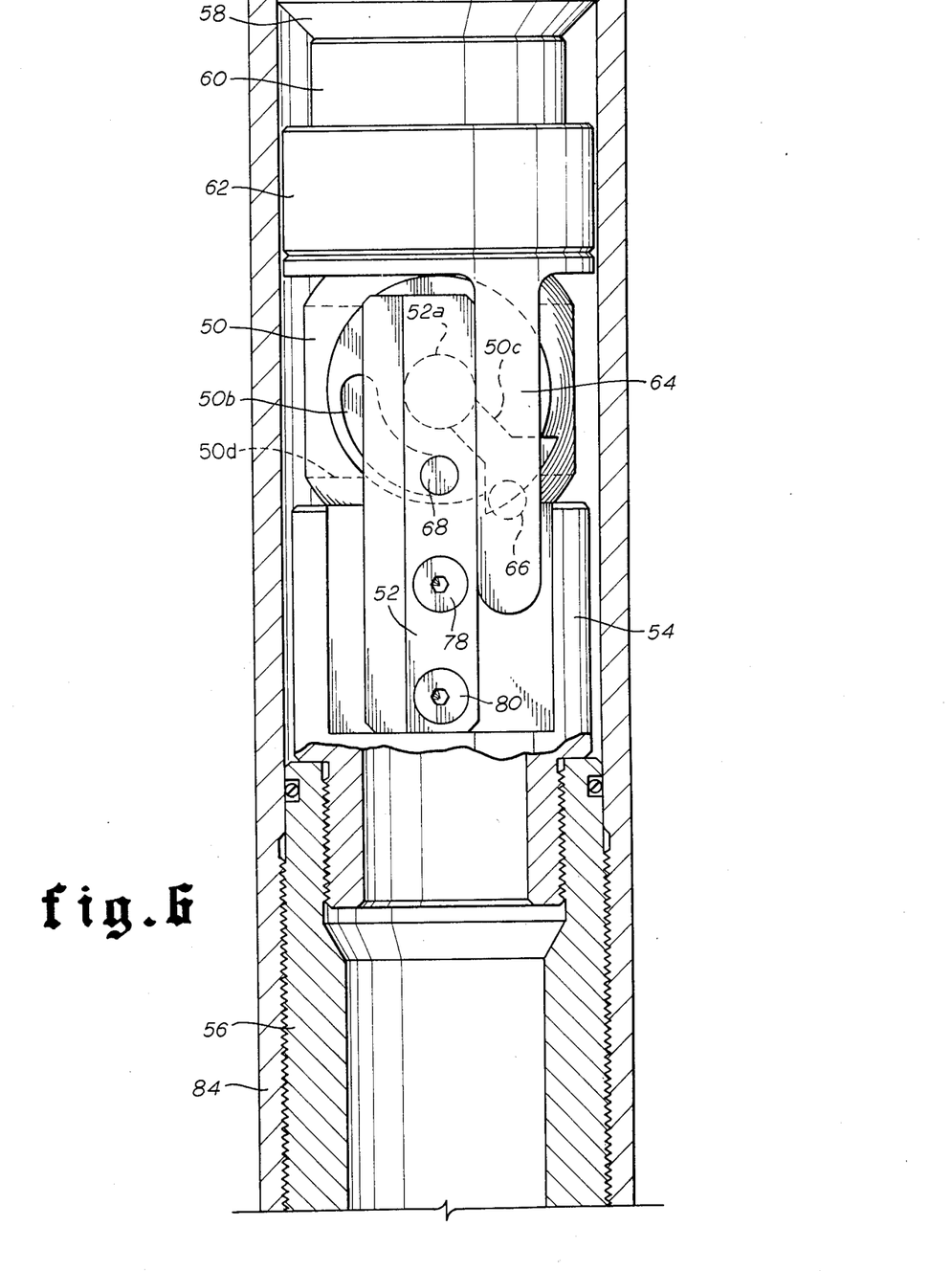
FIG. 6 is a view of the same valve apparatus shown in FIG. 5, showing the mechanism for shifting the valve element between the open and closed positions.
Figure 7:
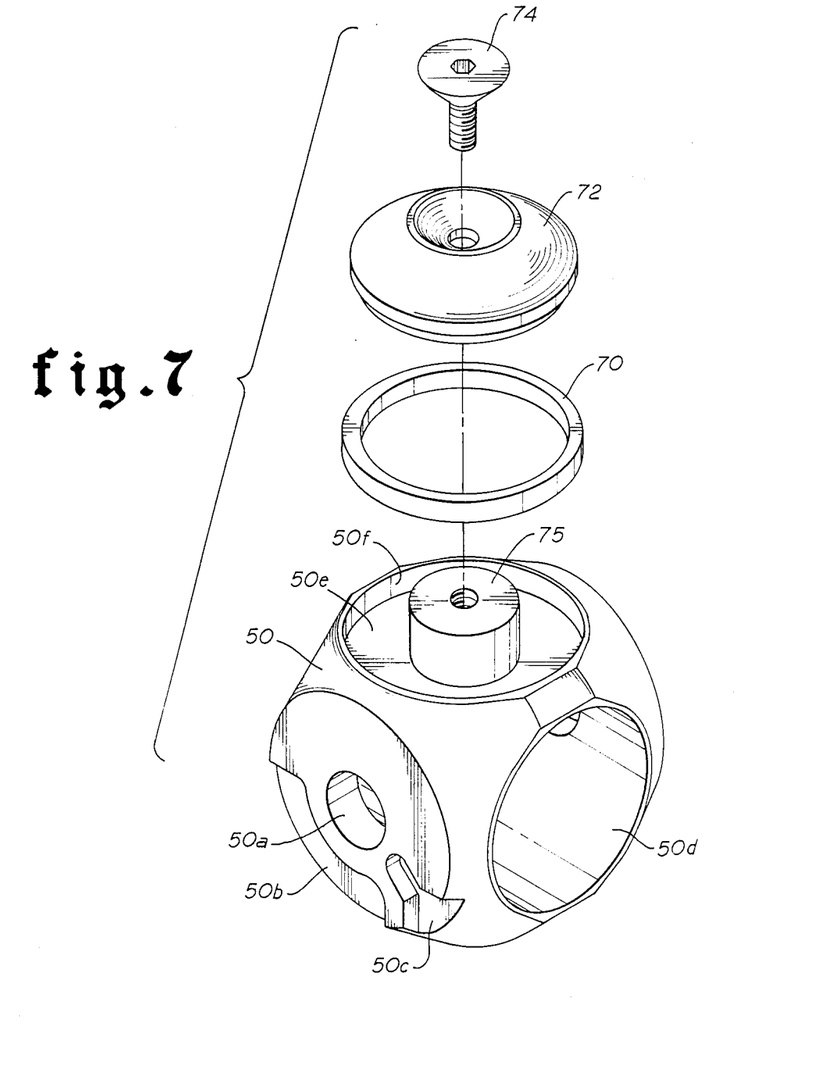
FIG. 7 is an exploded perspective view of the valve head showing the means in which the annular seal is secured to the valve head.
Figure 8:
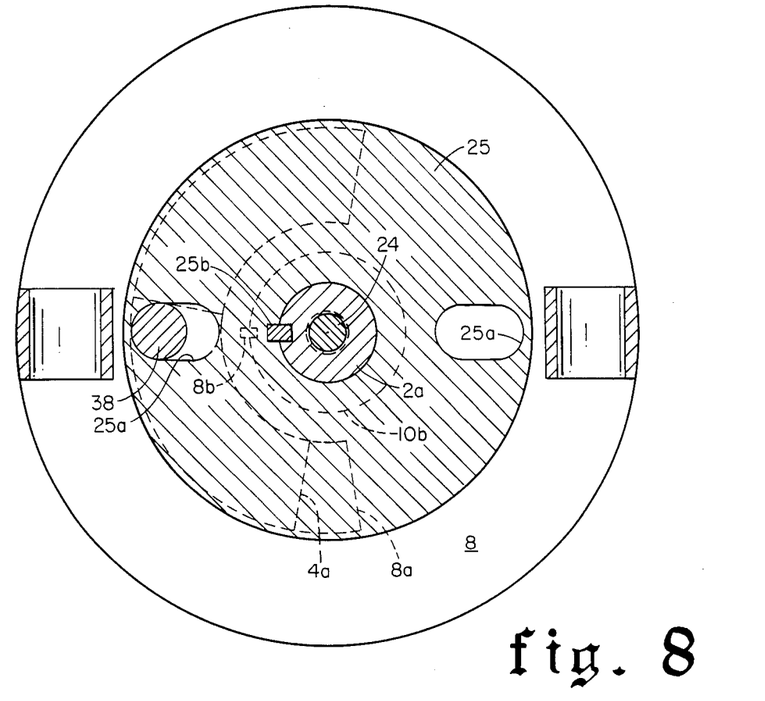
FIG. 8 is a sectional view taken on the plane 8—8 of FIG. 1.

Preferred embodiments of valve assemblies incorporating the invention are disclosed in FIGS. 1 through 4 and in FIGS. 5 through 7. Although the valves shown in the two embodiments differ, the differences are limited to necessary adaptation for use of the valve apparatus described herein in different applications or locations. For example, the embodiment of FIGS. 1 through 4 is intended for use in those applications where the valve is accessible and will be manually actuated. The embodiment of FIGS. 5 through 7 is intended for use when the valve is inaccessible, such as in a subterranean oil or gas well.

Referring to the embodiments shown in FIGS. 1 through 4, the valve shown therein is intended for use in a pipe or tubular conduit such as a conduit located at the surface of a well. The valve apparatus comprises a valve head 2 received within a valve housing 4. The valve 4 has an axially extending bore which is alignable with elements of the tubular conduit 32 and 34 attached to either end thereof. A flow tube 6 is received within the bore of housing 4 and is adapted for limited axial movement within the housing bore. The valve head 2 has a valve stem 2a extending transversely relative to the housing bore and through an opening in the housing 4. A separate opposed stem 2c on the valve head is received within a opening on the opposite side of the bore of housing 4. Valve head 2 has a central flow passage 2b extending completely therethrough, which has a diameter substantially equal to the inner diameter of the fluid transmission conduit sections 32 and 34.

Figure 1:
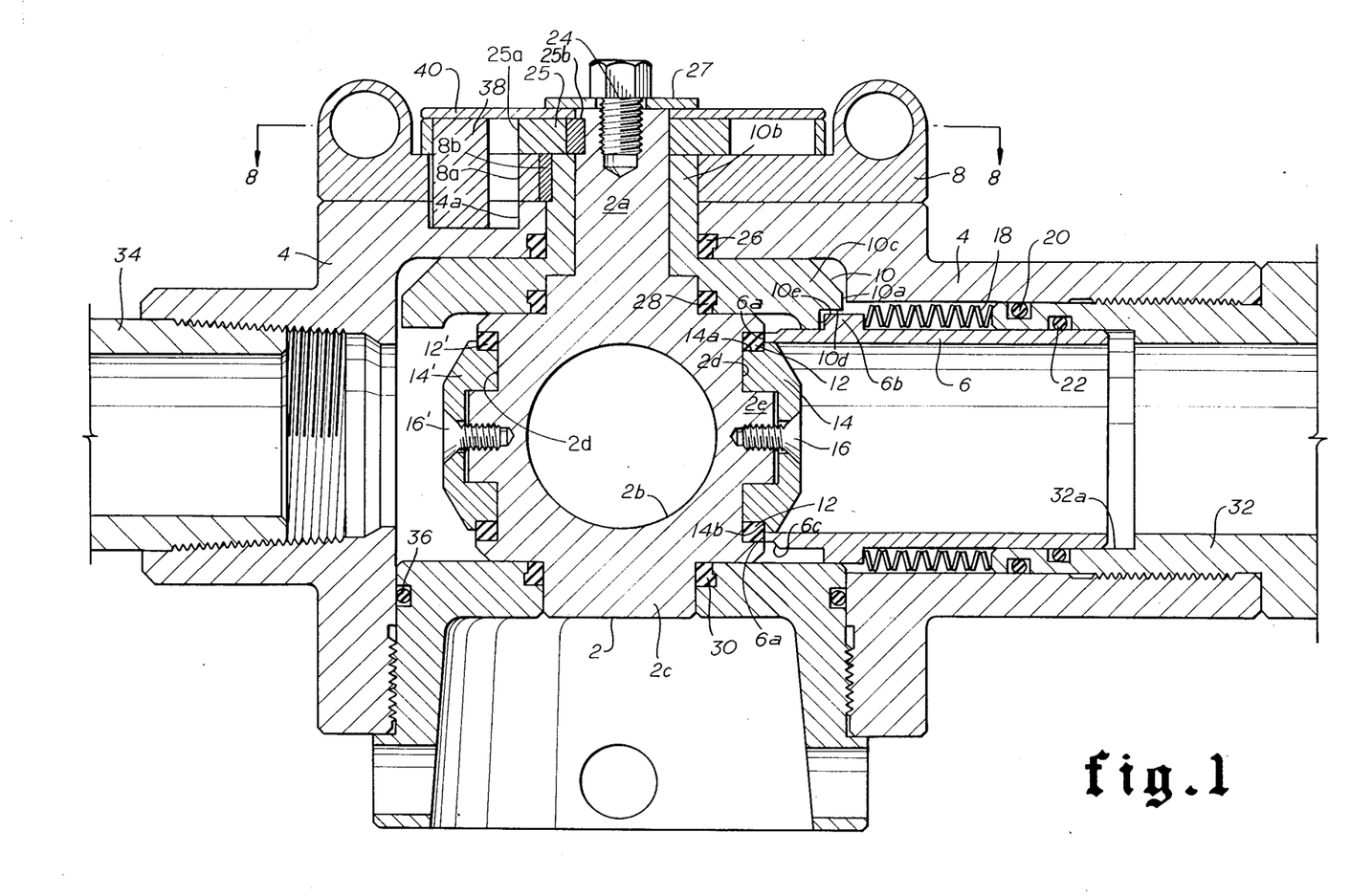
FIG. 1 is a view of a valve apparatus which can be used in a fluid flow conduit, such as a surface conduit, where the valve actuating apparatus is accessible.

A seal retainer assembly is secured to each side of the valve head 2 between opposite ends of the central flow passage 2b. Sealing integrity is maintained by annular seal 12 encircling the axis of the bore of housing 4 as shown in FIG. 1. Annular seal 12 can be fabricated from any conventional sealing material. For example, in most applications a conventional elastomer such as nitrile rubber can be used to construct annular seal 12. For higher temperature applications a thermoplastic material such as polytetrafloroethylene, commonly referred to under the Dupont trademark Teflon, can be used. A circular disk 14 can be secured to the valve head body 2 to hold the annular seal 12 in place. Retainer disk 14 is secured to the valve head 2 by means of a conventional screw 16. An annular recess is formed in each side of valve head 2 and defines a planar radial surface 2d extending around a cylindrical post 2e. A threaded bore in post 2e receives threaded screw 16 which in turns secures the seal retaining disk 14 to the valve head element 2. The outer periphery of the seal retainer disk 14 is fabricated to define a cylindrical edge 14a and a radial shoulder 14b dimensioned to retain the inner edge of annular seal 12 secured to valve head element 2 and in contact with the planar surface 2d. A similar annular valve seal 12' and seal retainer disk 14' are located on the opposite side of the valve head from the principal annular seal 12. The construction of annular seal 12' and retainer disk 14' is in all respects identical to the construction of elements 12 and 14.

The actuating valve head stem 2a is received within an actuator sleeve 10 which has a sleeve portion 10b and an actuator portion 10c. An annular seal 28 provides sealing integrity between the valve head 2 and the actuator portion 10c of the actuator sleeve 10. The diameter of seal 28 is less than the diameter of the valve head in contact with the lower surface of actuator portion 10c. A similar annular seal 30 provides sealing integrity between the lower valve stem 2c and the valve stem housing 4. The sleeve portion 10b of actuator sleeve 10 extends through a transverse bore of the valve housing 4 and an annular seal 26 having the same diameter as seal 28 is located between the actuator sleeve 10 and the valve housing 4. A recessed portion of the valve housing 4 adjacent the location of the valve head 2 provides clearance for the actuator portion 10c of the actuator sleeve. As seen in FIG. 1, the top portion sleeve portion 10b of actuator sleeve 10 is secured to a rotary actuating handle 8 by means of a conventional key connection 8b. The rotary actuating handle 8 has an arcuate groove 8a extending substantially 90 degrees partially encircling the actuator sleeve 10. A cooperating arcuate groove 4a is defined in the upper surface of the valve housing 4 and a pin 38 is received within the aligned slots 8a and 4a. The upper valve stem 2a is secured by means of a conventional threaded bolt 24 and a washer 27 to the cover 40. Control plate 25 is located between cover 40 and the handle 8 and is keyed to stem 2a by key 25b and has a radial slot 25a. A guide pin 38 is held within aligned slots 25a, 8a, and 4a by the cover 40. Thus, handle 8 may be initially rotated to turn actuator sleeve 10 without turning valve head 2.

Tubular member 6 located within valve housing 4 is shiftable in the axial direction of the valve housing towards and away from the valve head 2. Tubular member 6 comprises a movable valve seat and has a end sealing surface 6a positioned for engagement with the annular valve seal 12. An integral, external annular rib 6b is spaced from the valve surface 6a and extends completely around the tubular member 6. Conventional spring means 18 are in abutting engagement with one shoulder of rib 6b. The other end of the spring assembly 18 engages the end face on conduit connecting sub 32. O-ring or "V" ring seals 22 and 20 are respectively located on the inner and outer surfaces of conduit sub 32 in engagement with the valve housing 4 and the tubular sleeve 6. A downwardly projecting eccentric rib 10e adjacent the outer edge 10a of the actuator portion 10c of the actuator sleeve, is engaged by rib 6b on the tubular valve seat member 6. Comparing FIG. 1 and FIG. 2, it is apparent that the rib surface 10e on isolated actuator sleeve 10c is an eccentric surface having a center of rotation offset from the axis of the actuator sleeve 10.

FIGS. 1 through 4 depict the operation of the conduit valving apparatus described therein. In FIG. 1 the valve head 2 is rotated with the central flow passage 2b extending transversly relative to the axis of the conduit. Annular seal 12 is in alignment with the sealing surface of the movable valve seat or tubular member 6. If the pressure on the right portion of the valve in FIG. 1 is greater then the pressure on the left portion, a resulting pressure differential will act on tubular member 6 or valve sleeve 6 to urge the sleeve into sealing engagement with annular seal 12. If the pressure differential is insufficient to maintain proper sealing integrity, the spring assembly 18 urges the valve seat 6 toward the valve head 2 and away from the conduit sub 32.

Figure 2:
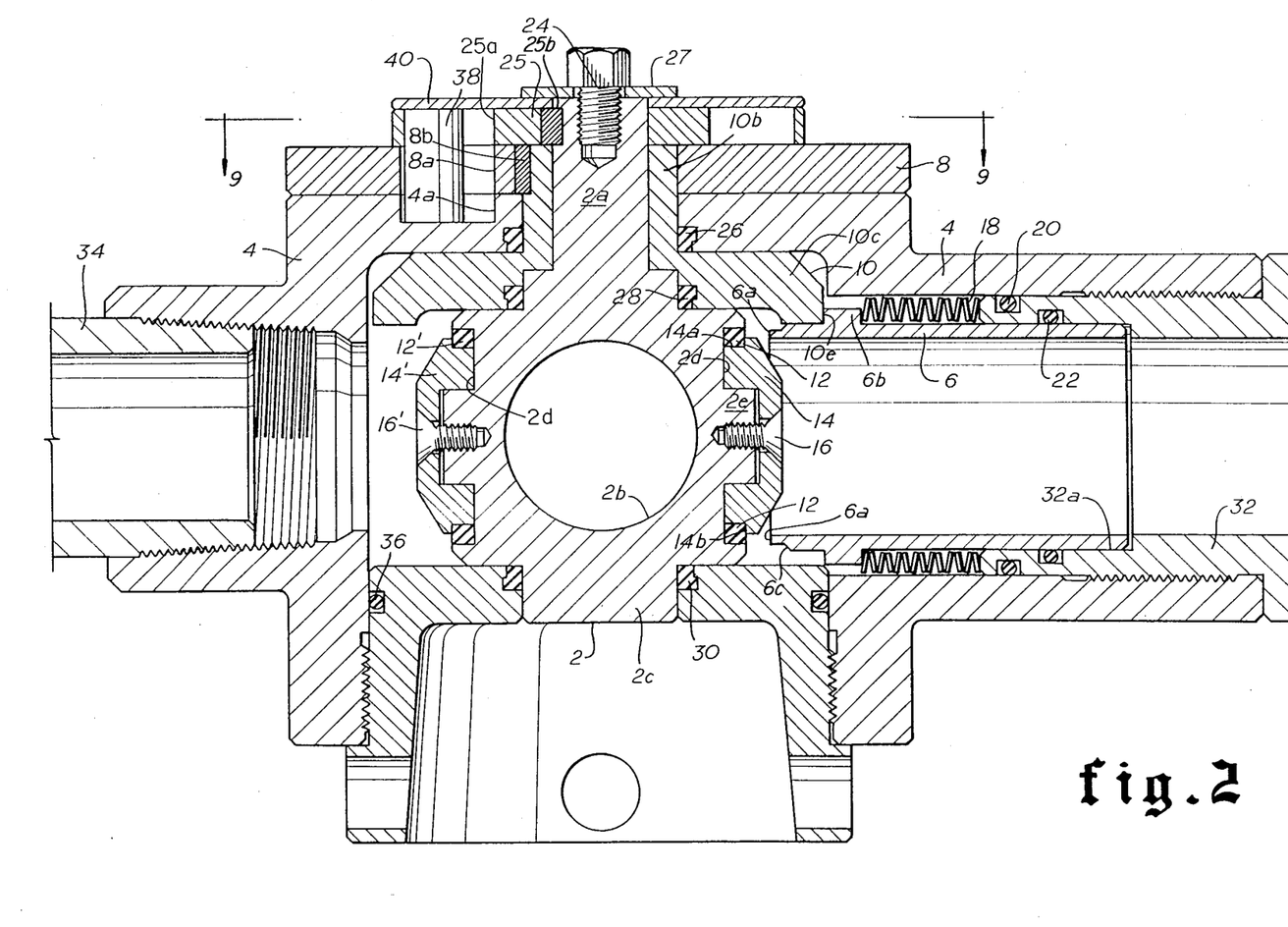
FIG. 2 is a view similar to FIG. 1 in which the actuator flow tube or sleeve or valve seat has been shifted out of engagement with the seal secured to the valve head to permit the valve to be unloaded or the pressures equalized across the valve prior to movement of the valve head from the closed to the opened positions.
Figure 3:
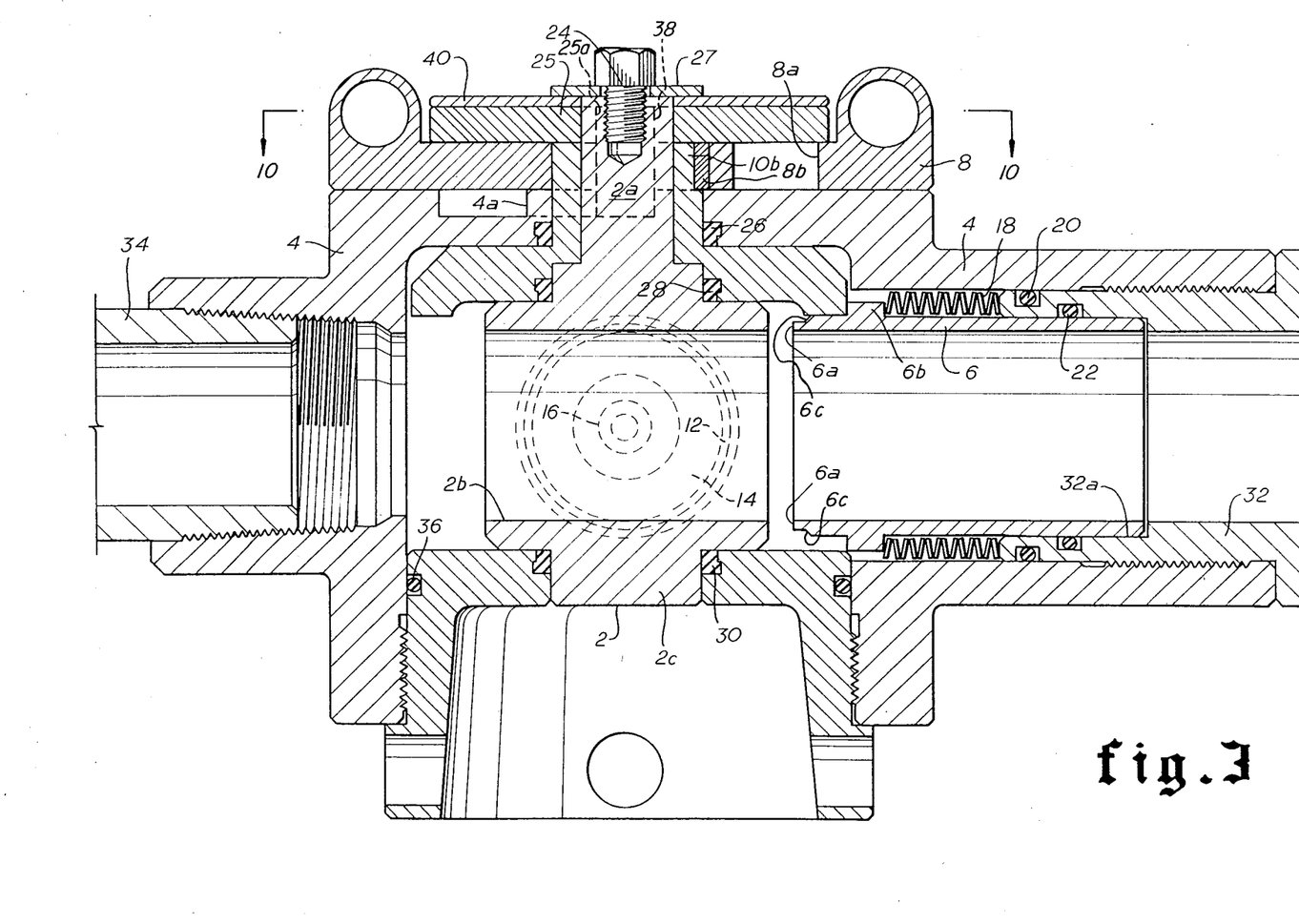
FIG. 3 is a view similar to FIGS. 1 and 2 in which the valve head has been shifted to the fully opened position to provide a substantially fully opened flow bore through the valve apparatus.
Figure 9:
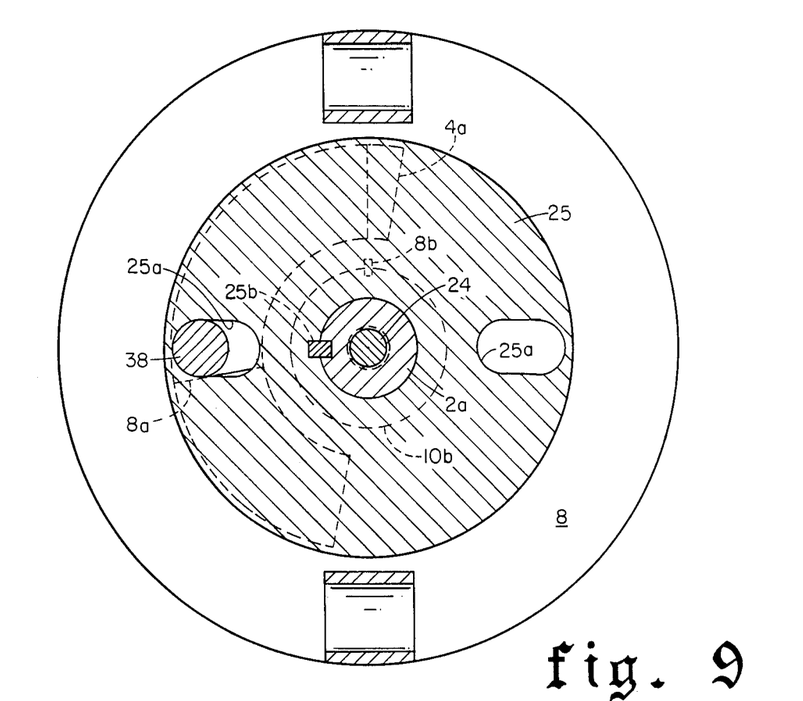
FIG. 9 is a sectional view taken on the plane 9—9 of FIG. 2.
Figure 10:
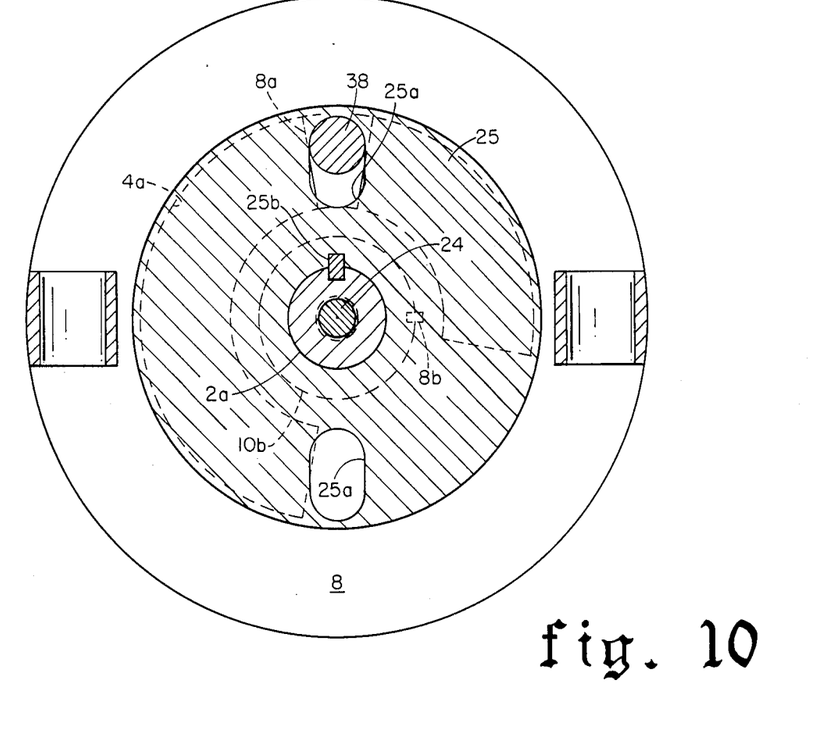
FIG. 10 is a sectional view taken on the plane 10—10 of FIG. 3.

The conventional actuation of the valve head 2 in the device of FIGS. 1 through 4 begins with the equalization of differential pressure across the closed valve head. FIG. 2 shows the means in which a differential pressure created by high pressure on the right in the presence of lower pressure on the left of the valve head 2 is equalized. Rotation of handle through angle of approximately 90 degrees moves the actuator portion 10c through an angle of approximately 90 degrees. The eccentric camming surface 10e of the actuator sleeve portion 10c engages the rib 6b of the movable valve seat or tubular member 6 to shift the member out of engagement with the annular seal 12. Tubular member 6 can thus be referred to as an unloader since it effectively unloads the differential pressure across the valve head prior to opening the valve. By unloading the differential pressure existing across the closed valve head 2, manipulation of the valve head from the open to the closed position is facilitated. Binding, sticking, friction, and other problems which are aggravated by attempting to open the valve with a pressure differential thereacross are significantly reduced. Since the seal 28 extends around the valve stem 2a and not around the housing bore, sealing integrity is not maintained across the valve head once the cylindrical valve seat unloader 6 is shifted out of engagement with the annular seal 12. Once the pressure differential existing across the valve head 2 has been equalized, the valve head is moved from the closed position (FIG. 1) to the open position (FIG. 3) in which central flow passage 2b is aligned with the housing bore valve by continued rotation of handle 8. Since the slot 8a does not extend entirely around the handle, the handle will be brought into engagement with the guide pin 38 after the unloader mechanism has been manually shifted to equalize pressure, as shown in FIGS. 2 and 9, and continued rotation of handle 8 will cause the guide pin 38 to rotate control plate 25 to effect rotation of the valve stem 2a. Preferably, rotation of the handle 8 through an angle of 180 degrees will shift the unloader or valve seat 6 during the first 90 degrees of rotation and will rotate the valve head 2 from the closed to the open position during the second 90 degrees rotation.

FIG. 4 illustrates an alternate manner in which the valve seat or unloader 6 can be shifted out of engagement with the closed valve head 2. The valve as shown in FIG. 4 can act not only as a rotary-manipulated flow valve but can also act as a check valve. Check valve operation in FIG. 4 occurs as a result of a pressure differential acting across the valve head 2. With the valve in the position of FIG. 1, the pressure on the right will be either greater than or virtually equal to the pressure to the left of the valve head. The cylindrical valve seat or unloader 6 will be maintained in the closed position either by a higher pressure on the right side of the valve head or by the action of the spring assembly 18. An increase in pressure on the left of the valve head will act on the cylindrical valve seat 6, and when the pressure to the left of the valve head 2 has increased sufficiently, the pressure force acting on the shoulder 6c of the cylindrical valve seat 6 will be sufficient to urge the cylindrical valve seat out of engagement with annular seal 12. Thus, the valve depicted in FIGS. 1 through 4 comprises not only a flow valve but can also comprise a one-way-acting check valve, permitting flow around the closed valve head 2.

In addition to the normal operation of the valve in FIGS. 1 through 4, the presence of a redundant seal 12' and seal retaining cap 14', located on the portion of the valve not in engagement with the tubular valve seat 6, provides a redundant seal which can be actuated while the valve is under pressure. Temporary removal of pin 38 from slot 4a permits continued rotation of the handle 8 from the position shown in FIG. 3, in the same direction will shift valve seal 12' to the position occupied by valve seal 12 in FIG. 1. Thus, the valve apparatus depicted in FIGS. 1 through 4 could be rendered operative even after deterioration of the primary valve seal 12 due to physical damage or to gas impregnation or to corrosion of the valve. Furthermore, the position of the annular seal 12 surrounded on three sides by the valve head 12 and the retainer disk 14 and engaged on the fourth side by the seal compressor surface 6a of valve seat 6 protects the seal against mechanical damage, against corrosion, against extrusion under high pressures and temperatures, and should retard gas impregnation of the annular seal.

The valve head 50 of the configuration shown in FIGS. 5 through 7 contains a similar seal assembly comprising annular seal 70, seal retainer disk 72, threaded member 74, valve head planar surface 50e, and cylindrical inner surface 50d as employed in the valve head of the configurations of FIGS. 1 through 4. Valve head 50 has a central flow passage 50d which can be oriented to extend transversely relative to the bore of the valve housing as shown in FIG. 5. To open the valve housing bore, the valve head 50 is rotated 90 degrees to align the valve head central passage 50d with the bore of the valve housing.

The valve apparatus depicted in FIGS. 5 and 6 houses a portion of a conventional downhole valve which could be actuated in a number of conventional ways. The valve apparatus comprises an outer tubular housing 84 secured by means of conventional threaded connections to tubular body 56 which defines a portion of the housing bore. A conventional O-ring 82 prevents fluid communication through the threads interconnecting the outer housing 84 and the body 56. The valve head 50 is rotatable in a valve cage 52 which is secured by bolts 78 and 80 to the valve cage sub 54. Short shaft portions of 52a and 52b are located on opposite sides of valve cage 52 and are received within holes 50a on the opposite sides of valve head 50. The actuator 64 shifting the valve head 50 from the closed position of FIG. 5 to the open position of FIG. 6 comprises a tubular actuating assembly 58 comprising inner tubular projection 58a depending from an outer tubular member 58b. A tubular valve seat 60 is threadably and sealably secured to inner tubular member 58b. Actuating arm 64 is secured to valve sleeve 60 by retaining sleeve 62 and extends downwardly through appropriate slots in the valve cage 52 as best shown in FIG. 6. An actuating pin 66 is fixed to actuating arm 64 and is received within actuating slot 50c on the side of the valve head 50. Actuating slot 50c has an enlarged opening at the end and actuating pin 66 can be shifted in the axial direction for a short distance without imparting rotation to valve head 50. When the actuating member 58 is shifted axially upwardly relative to the valve cage 52, initial movement will shift the cylindrical valve sleeve or unloader out of engagement with the annular seal 70. This unloading permits equalization across the valve head and occurs during movement actuating pin 66 relative to the valve head 50 and prior to engagement of the actuating pin 66 into the enlongated slot portion of slot 50c. Continued movement of the actuating mechanism 58 in the upper direction in FIG. 5 will cause engagement of actuating pin 66 with the sides of slot 50c imparting rotation to the valve head 50 about the shafts 52a and 52b. As the actuating members 58a and 58b continue to move upwardly, the central flow passage 50d is moved from the closed position of FIG. 5 to the opened position (not shown). A pin 68 secured to valve cage 52 and received within a slot 50b on the exterior of the valve head 50, limits rotation of the valve head to an angle of 90 degrees, just sufficient to shift the ball valve head 50 between the open and closed positions.

FIG. 7 is an exploded view of the valve head shown in the embodiment of FIGS. 5 and 6, showing the manner in which the valve disk 72 can be assembled to the valve head to secure the annular seal 70 thereto. The annular planar surface 50e and peripheral surface 50f on the valve head with which the annular seal 70 is in contact are clearly shown in FIG. 7. The valve disk 72 is secured to the central post 75 by the threaded member 74 to secure the annular valve seal to the valve head 50. Although the actuating mechanism shown on the valve head in FIG. 7 differs from the actuating mechanism shown on the embodiment of FIGS. 1 through 4, the annular valve seal and seal retaining disk and the portion of the valve head receiving this disk are similar for both of the embodiments depicted herein.

It will be noted that in both modifications of this invention, the annular sealing element is surrounded on more than three sides by metallic elements and, hence, protected thereby from damaging contacts by the well debris. Furthermore, extrusion of the seal material is minimized by the metallic backup.

Additionally, a metal-to-metal seal can also be established between the end surface of the actuator tubing and the ball surface surrounding the resilient seal.

The construction of the valve assemblies comprising the two preferred embodiments of the invention depicted herein differ in the manner of actuating the valve head to open and close the valve. It should be clear, however, that the sealing assembly in which the annular seal is secured to the valve head is not limited to the embodiments depicted herein, but should be applicable to a number of valve configurations capable of a multitude of different uses. For example, the assembly depicted herein could be used in a downhole test valve or safety valve or surface valve.

Although the invention has been described in terms of the specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A combination flow control and check valve apparatus for use in a fluid flow conduit comprising: a valve housing having a bore communicable with the conduit; a valve head having a post portion journalled in said valve housing for rotation of the valve head through 90° about an axis transverse to the axis of the housing bore between open and closed positions; a pair of annular seals secured to the valve head in diametrically opposed relation; a cylindrical element movable relative to the valve head and engagable with a selected one of the annular seals to isolate portions of the conduit on opposite sides of the valve head when the valve head is in the closed position; resilient means urging said cylindrical element into sealing engagement with said selected annular seal, the cylindrical element being exposed to pressure on both sides of the valve head, the cylindrical element being shiftable into engagement with the annular seal when force due to the pressure differential in a first direction exceeds a prescribed level and shiftable out of engagement with the annular seal when the force due to the pressure differential in an opposite second direction exceeds the force exerted by said resilient means; a cam housing having a tubular portion rotatably mounting said valve head post and journalled in said housing; an operating handle secured to said tubular portion for rotating said cam housing; cam means on said cam housing engagable with said cylindrical element to shift said cylindrical element axially out of engagement with said annular seal; a plate element keyed to said post and disposed adjacent to said operating handle; and pin and slot means operatively connecting said handle and said plate element to rotate said valve head 90° from said closed position to said open position only after said cylindrical element is shifted out of engagement with said annular seal; said pin being removable to permit rotation of said valve head through 180° to position the other annular seal for engagement by said cylindrical element.

* * * * *